Patented July 14, 1942

2,289,780

UNITED STATES PATENT OFFICE 2,289,780

PROCEDURE FOR PREPARING FISH OILS

Kenneth C. D. Hickman, Rochester, N. Y., assignor to Distillation Products, Inc., Rochester, N. Y., a corporation of Delaware No Drawing. Application October 11, 1939, Serial No. 298,966

10 Claims. (Cl. 260—412.1)

This invention pertains to the art of preparing fish oils and particularly fish body and liver oils of high vitamin content.

In the fish oil industry it has been found difficult to prepare oils of high quality as regards odor, taste, color and vitamin content. The difficulties which lead to oils of poor quality are encountered not only in the processing stage but also during the stages between the time the fish is caught and the time that the fish or its appropriate organs are treated in the extraction mill. Fish carcasses and organs, such as liver and entrails rapidly decompose. This is particularly true when the fishing is done in warm weather for extended periods of time without removal of the fish catch. As a consequence, the character of the oils expressed from fish tissue has been far from satisfactory.

This invention has for its object to provide a process for preventing destruction and loss of vitamin containing fish oils during the period between the time that the fish is caught, to and including the time that the oil is removed therefrom. A further object is to provide an improved procedure for removing oils from fish tissue. Another object is to provide a procedure for preventing decomposition and rancidification of fish tissue and the oils contained therein during the period before the oil is expressed therefrom and/or during the period that the fish tissue is processed to remove its contained oil or any part thereof. Other objects will become apparent from the following description.

These and other objects are accomplished by my invention which includes maintaining the fish tissue and/or its contained oil in intimate contact with an active oxygen absorber during at least part of the time between the moment that the fish is caught and the time at which the expressed oil is removed from the expressing plant or mill.

In the following description and claims I have set forth several of the preferred embodiments of my invention but it is to be understood that they are given for the purpose of illustration and not in limitation thereof.

In accordance with my invention, the fish tissue which is to be treated to remove oil therefrom is maintained in contact with substances which actively absorb oxygen.

By such oxygen absorbers is meant materials which in the solid state or in solution, remove oxygen, providing a substantially oxygen-free solution. They are not to be confused with antioxidants which cause little alteration of the oxygen concentration but serve to prevent reaction with this oxygen. One and the same substance may act as an oxygen absorber and as an antioxidant, and I include within this invention substances of both classes whether mixed together or a single substance serving both functions, provided only that one of the functions shall be that of active oxygen absorber. Such substances are the reduced compounds of certain metals and non-metals including particularly all the compounds of sulphur and phosphorous capable of reacting with oxygen or its equivalent, examples are sulfites and bisulfites such as sodium and potassium sulfites, hydrosulfites, sulfurous acid, phosphites, hypophosphites, hydrazine, hydroxyl amine, ferrous, titanous, cerous manganous, chlorides, nitrates, sulfates and other salts of reduced valency. Organic reducing agents such as pyrogallic acid, hydroquinone, diphenyl amine, amidol, etc., may be used in combination with the active absorbing agents. Substances which form active oxygen absorbers may be employed.

The fish tissue such as fish carcasses or fish organs may be directly salted down in the hold in the ship with the active oxygen absorbers. Water tight tanks or barrels would, of course, be preferred but such equipment is customary. The use of aqueous solutions of the active oxygen absorbing agents may be desirable, particularly if there is insufficient water present in the fish tissue to result in thorough solution of the protecting substance.

In processing fish body, liver or other tissue to remove oil therefrom, it is customary to employ one of three general types of procedures, namely, pressing, solvent extraction, or digestion with chemicals such as alkali. Combinations of these procedures are often used. Each such procedure usually involves as a first step pulping or comminuting the fish tissue in order to increase the surface area present for oil removal. If the fish tissue being introduced into the oil removal plant has already been protected in accordance with my invention, it may be unnecessary to add additional oxygen absorbers, or small additional amounts may be added. However, if untreated fish tissue is to be processed, it is desirable to add the absorbing chemical immediately and preferably before the fish tissue is subjected to the comminution treatment. The active oxygen absorbers are then present during the entire processing procedure and exert their protective influences throughout. The protective agents can, of course, be added at any stage of the process and as explained above, solids or aqueous solutions of the protective agents may be used.

The oxygen absorber can be present during the entire period between the catching of the fish to and including the oil removal stages or any part thereof. It is preferred to have these protective agents present during the oil processing treatment because during this period the fish tissue is heated, stirred, splashed or flowed in such a manner that it comes into contact with large volumes of air generally under alkaline conditions which favor reactions with oxygen. The conditions, therefore, are such as to cause extensive oxidation of the fish tissue, the fish oil and/or the vitamins contained therein. The presence of active oxygen absorbers in accordance with my invention almost completely avoids loss due to oxidation at this stage and as a result yields a fish oil of high vitamin content having superior odor, taste, etc., which commands a much higher market price.

In some cases, the fish meal after removal of the oil is used for purposes in which the presence of the sulfites, sulfurous acids, etc. would be undesirable. In such cases volatile sulfites such as ammonium sulfite or organic sulfites can be used. These can be volatilized from the fish residue with little difficulty.

The rate of removal of oil from fish tissue is in some cases dependent upon the hydrogen ion concentration. The use of alkali to raise the hydrogen ion concentration does not in any way harm the beneficial oxygen absorbing agents. This can also be controlled by using bisulfites, or buffered solutions of sulfite-bisulfite mixtures may be employed for this purpose.

Example 1

Lingcod when withdrawn from the net are degutted and the livers removed. The livers and the viscera are separately thrown into tanks containing a solution of sodium sulfite in strength varying from 1% to a saturated solution. It is arranged that when the vessel is filled with fish products the mass shall be substantially permeated or covered by the sodium sulfite solution. Alternatively, the livers or viscera may be salted down with solid sodium sulfite and the full vessel may have a substantial layer of solid sodium sulfite thrown on the top before closure. It is intended that fish products so packed shall be transported and kept in this condition until the time of rendering the oil. They may be frozen in addition during the period.

At the time of rendering, the livers are unfrozen and thoroughly pulverized. The resulting slurry is tested for the presence of sodium sulfite, and if the latter has oxidized to a substantial degree, more is added to keep the solution sufficiently free from oxygen to enable the extraction of the oil to be performed under good conditions. It is generally necesary to have present at the beginning of the rendering operation sodium sulfite in the proportion of 1–10% of the weight of the original livers or viscera.

After the livers have been reduced to a slurry with the sodium sulfite, alkali may be added, and if necessary a quantity of hydroquinone or pyrogallol equal to $\frac{1}{10}$% of the weight of the livers is thrown in. After digestion at temperatures between the prevailing room temperature and the boiling point of the solution, the mixture is left to settle or is centrifuged to remove oil. In the case of livers poor in oil, such for instance as skipjack livers, containing less than 5% of oil, it may be desirable to add to the slurry with agitation a quantity of low potency fish oil or a vegetable oil or a low vapor pressure oil, such as a still residue oil from the molecular distillation of vegetable or animal oils, the volatile constituents of which have been removed therefrom by the distillation treatment. In any case, the slurry is passed through the centrifuge where most of the native oil or oil mixture is separated. The watery portion is returned to another treatment tank where more of the low potency oil is added and stirred with the centrifuged slurry. The mixture may be tested for sulfite content, and when necessary more sulfite is added with or without organic reducing agent, such as hydroquinone or pyrogallic acid. The mixture is now recirculated through the centrifuge, and a quantity of second run fish oil is secured. The partially exhausted slurry is returned to extraction tanks as often as necessary and extracted with further quantities of low-grade oil with or without additional protection with sodium sulfite.

Because of the high electrolyte content of the sulfite slurry, certain water-soluble materials which would otherwise remain in the aqueous phase may pass into the oily layer. It may be desirable, therefore, to wash the oil in plain water or in water containing a lesser quantity of sulfite or equivalent and again to centrifuge. The process may be repeated as desired.

Example 2

Salmon-body oil may be secured according to my invention in the following manner: The salmon having been caught for edible purposes, it is impractical to effect preservation with sodium sulfite. The rejected bodies with or without additional viscera from other bodies are reduced to a slurry in the presence of a 2% solution of sodium hypophosphite. Alternatively, a 10% solution of sodium sulfite may be used or a 10% solution of a mixture of sodium sulfite and sodium bisulfite with or without the addition of sodium hydrosulfite. The slurry after appropriate digestion is centrifuged as in the previous example to obtain a superior quality of salmon oil. Owing to the low vitamin content of this oil, it is considered unnecessary to wash the slurry with a further quantity of low-grade or non-vitamin-bearing oil, though this may be done if necessary, as described in the previous example.

In many cases, it is customary to separate the oil expressed at different stages into separate grades, the oil separated in the later stages being of poor quality. The second and third grade oils heretofore prepared have been suitable only as animal feeds and have been of such low quality that in many cases they are even unsuitable for treatment to concentrate their vitamin content by procedure such as high vacuum distillation or saponification. My procedure results in oils of good quality even in the last extraction stages. The oils thus prepared are excellently suited for treatment by vacuum distillation to separate and concentrate the vitamin content thereof. My invention has been found to have other surprising advantages. The presence of the active oxygen absorbing agents results in increased oil yield. In one commercial run the amount of oil extracted from fish liver was increased 12%. Another surprising advantage is that the centrifugal separation of the oil from the fish tissue is completed in less time than heretofore required.

What I claim is:

1. The process for preparing improved fish oils which comprises adding an active oxygen absorbing material to the fresh or undecomposed fish tissue at some period between the time the fish is caught to and including the time the fish tissue is treated to remove oils therefrom, the quantity of active oxygen-absorbing agent which is added being sufficient to remove substantially all oxygen and like destructive substances present and to maintain the fish tissue in a deoxygenated condition whereby the oil and vitamin content of the fish tissue are substantially completely protected against deterioration caused by oxygen of the air.

2. In the process for preparing fish oils the improvement which comprises adding an active oxygen absorbing agent to fresh or undecomposed fish tissue, from which the oil is to be removed, soon after the fish tissue is removed from its natural habitat, the quantity of active oxygen-absorbing agent which is added being sufficient to remove substantially all oxygen and like destructive substances present and to maintain the fish tissue in a deoxygenated condition whereby the oil and vitamin content of the fish tissue are substantially completely protected against deterioration caused by oxygen of the air.

3. In the process of preparing fish oil from fresh or undecomposed fish tissue the improvement which comprises maintaining the fish tissue in contact with an active oxygen absorbing agent during at least a part of the processing or extraction treatment, the quantity of active oxygen-absorbing agent being sufficient to remove substantially all oxygen and like destructive substances present and to maintain the fish tissue in a deoxygenated condition whereby the oil and vitamin content of the fish tissue are substantially completely protected against deterioration caused by oxygen of the air.

4. In the process of treating fresh or undecomposed fish liver to remove fish liver oil therefrom, the step which comprises adding to the fish liver, at some stage of the processing treatment, a substance which actively absorbs oxygen, the quantity of active oxygen-absorbing agent which is added being sufficient to remove substantially all oxygen and like destructive substances present and to maintain the fish tissue in a deoxygenated condition whereby the oil and vitamin content of the fish tissue are substantially completely protected against deterioration caused by oxygen of the air.

5. In the process of treating fresh or undecomposed fish liver to remove fish liver oil therefrom, the step which comprises adding to the fish liver at some stage of the processing treatment a buffered active oxygen absorbing agent, the quantity of active oxygen-absorbing agent which is added being sufficient to remove substantially all oxygen and like destructive substances present and to maintain the fish tissue in a deoxygenated condition whereby the oil and vitamin content of the fish tissue are substantially completely protected against deterioration caused by oxygen of the air.

6. The process of claim 5 in which buffered sodium sulfite is used.

7. In the process of treating fresh or undecomposed fish liver to remove oil therefrom, the step which comprises adding sodium sulfite to the fish liver at some stage during the processing treatment, the quantity of sodium sulfite which is added being sufficient to remove substantially all oxygen and like destructive substances present and to maintain the fish tissue in a deoxygenated condition whereby the oil and vitamin content of the fish tissue are substantially completely protected against deterioration caused by oxygen of the air.

8. The process of protecting fish oils and associated oxidizable substances such as vitamins contained in fresh or undecomposed fish tissue against oxidation prior to, and during extraction thereof which comprises intimately associating the fish tissue with an active oxygen absorber such as sodium sulfite, the quantity of sodium sulfite associated with the fish tissue being sufficient to remove substantially all oxygen and like destructive substances present and to maintain the fish tissue in a deoxygenated condition whereby the oil and vitamin content of the fish tissue are substantially completely protected against deterioration caused by oxygen of the air.

9. In the process for preparing fish oils the improvement which comprises adding an active oxygen absorbing agent and an antioxidant to the fresh or undecomposed fish tissue, from which the oil is to be removed, soon after the fish tissue is removed from its natural habitat, the quantity of active oxygen-absorbing agent which is added being sufficient to remove substantially all oxygen and like destructive substances present and to maintain the fish tissue in a deoxygenated condition whereby the oil and vitamin content of the fish tissue are substantially completely protected against deterioration caused by oxygen of the air.

10. In the process for preparing vitamin-containing fish oils by extraction of fresh or undecomposed fish tissue the step which comprises extracting the oil from the fish tissue while the fish tissue is maintained in the presence of a sufficient amount of active oxygen-absorbing agent to remove substantially all oxygen and like destructive substances present and to maintain the fish tissue in a deoxygenated condition whereby the oil and vitamin content of the fish tissue are substantially completely protected against deterioration caused by oxygen of the air.

KENNETH C. D. HICKMAN.